United States Patent
Arnaud et al.

(10) Patent No.: US 9,476,384 B2
(45) Date of Patent: Oct. 25, 2016

(54) ACTUATION DEVICE FOR MOVING A MOVABLE COWLING OF A THRUST-REVERSER

(71) Applicant: Sagem Defense Securite, Boulogne-Billancourt (FR)

(72) Inventors: Daniel Arnaud, Boulogne-Billancourt (FR); David Charrier, Boulogne-Billancourt (FR); Mickael Werquin, Boulogne-Billancourt (FR); Rinaldo Fadini, Boulogne-Billancourt (FR); Sebastien Coureux, Boulogne-Billancourt (FR)

(73) Assignee: SAGEM DEFENSE SECURITE, Boulogne-Billancourt (FR)

(*) Notice: Subject to any disclaimer, the term of this patent is extended or adjusted under 35 U.S.C. 154(b) by 0 days.

(21) Appl. No.: 14/895,811

(22) PCT Filed: Jun. 4, 2014

(86) PCT No.: PCT/EP2014/061621
§ 371 (c)(1),
(2) Date: Dec. 3, 2015

(87) PCT Pub. No.: WO2014/195371
PCT Pub. Date: Dec. 11, 2014

(65) Prior Publication Data
US 2016/0123275 A1    May 5, 2016

(30) Foreign Application Priority Data
Jun. 4, 2013   (FR) ..................................... 13 55114

(51) Int. Cl.
*F02K 1/76*   (2006.01)
*F16H 25/24*   (2006.01)

(52) U.S. Cl.
CPC ............... *F02K 1/766* (2013.01); *F02K 1/763* (2013.01); *F16H 25/2454* (2013.01)

(58) Field of Classification Search
USPC ..................... 74/89.39; 60/226.2; 244/110 B
See application file for complete search history.

(56) References Cited

U.S. PATENT DOCUMENTS

| | | | | |
|---|---|---|---|---|
| 3,442,176 A | * | 5/1969 | Geyer | F15B 15/261 91/44 |
| 3,621,763 A | * | 11/1971 | Geyer | F15B 11/22 244/110 B |
| 6,487,846 B1 | * | 12/2002 | Chakkera | F02K 1/766 239/265.27 |
| 6,752,066 B2 | * | 6/2004 | Varetto | B25B 5/122 92/17 |
| 6,786,039 B2 | | 9/2004 | Chakkera et al. | |
| 2004/0206066 A1 | | 10/2004 | Eschborn | |

FOREIGN PATENT DOCUMENTS

WO    WO 2005/050062 A1    6/2005

OTHER PUBLICATIONS

International Search Report date mailed Jun. 26, 2014.

* cited by examiner

*Primary Examiner* — William C Joyce
(74) *Attorney, Agent, or Firm* — Blakely Sokoloff Taylor & Zafman LLP (57) ABSTRACT

The invention relates to an actuation device (1) for moving the movable cowling of a thrust reverser, comprising: an actuator (7) with a first member (12) such as a screw, and a second member (14) such as a nut, wherein the first and second members are capable of engaging such that the rotation of the first member results in a translation of the second member, a locking device (33) including a locking part (34) movable between a locked position for preventing to the rotation of the first member and an unlocked position for enabling the rotation of the first member, and a lock inhibiting device (42) comprising a recess (46) and a ball (47) movable in the recess between a stowed position, in which the ball enables the movement of the locking part, and an inhibition position in which the ball prevents the locking part from returning into the locked position.

14 Claims, 6 Drawing Sheets

ACTUATION DEVICE FOR MOVING A MOVABLE COWLING OF A THRUST-REVERSER

FIELD OF THE INVENTION

The invention relates to an actuating device for moving a movable cowl of a thrust reverser.

PRIOR ART

Airplane propulsion assemblies or PPS (Power Plant System) generally comprise a nacelle and a turbojet engine fastened to a pylon of a wing or to a fuselage of the airplane. In the case of a turbojet engine with a double stream and a high dilution rate (turbofan), the turbojet engine includes a gas generator (high-pressure unit), a low-pressure unit, a fan and nozzles. The fan accelerates a secondary air flow circulating in an air stream of the fan, to generate the necessary thrust for propelling the airplane.

Airplane propulsion assemblies generally comprise a thrust reverser system or TR system for reversing thrust in the landing phases in order to improve the braking capability of the airplane. Such a system comprises a set of movable cowls, actuated by a set of connected actuators for temporarily obstructing the air stream and diverting the secondary air flow toward the outside and toward the front of the nacelle, thereby generating a counterthrust that is added to the braking of the wheels.

In the case of a "door-type" thrust reverser system, the nacelle is equipped with movable cowls (known as "doors") that pivot relative to the structure of the nacelle between a retracted position in which they allow the air flow in the air stream to flow toward the outside and toward the back of the nacelle, and a deployed position wherein the cowls obstruct the air stream and reorient the air flow outward and toward the front of the nacelle.

In the case of a so-called "grating" or "cascade-type" thrust reverser system, the nacelle is equipped with movable cowls that slide relative to the structure of the nacelle along rails, between a retracted position in which they allow the circulation of the secondary stream in the air stream toward the outside and toward the back of the nacelle, and a deployed position in which they uncover deflector vane gratings disposed in the thickness of the nacelle and obstruct the air stream by way of flaps, the actuation of which is linked to the motion of the cowls.

In general, in one case or the other, the movable cowls are actuated by a set of dedicated actuators. Mechanical synchronization of the motion of the actuators is provided by a synchronization system comprising flexible shafts for mechanically linking the actuators with one another.

Furthermore, thrust reverser systems must of necessity comprise several locking devices for preventing accidental deployment of the cowls in the flight phase. Among other locking devices equipping the thrust reverser system, certain locking systems known as "primary" or PLS (primary lock system) act on the flexible shaft to block the flexible shaft in rotation.

The document U.S. Pat. No. 6,786,039 describes a system for actuating a thrust reverser comprising an actuator driven to move between a retracted configuration and a deployed configuration by way of a drive shaft linked to a flexible shaft. The system comprises a locking device that can be controlled to engage or disengage the drive shaft in order to prevent or allow the rotation of the drive shaft. The system further comprises a lock inhibitor for holding the locking device in the disengaged position while the actuator is not in the retracted configuration.

A drawback of the proposed system is that the locking device is cantilevered on the casing of the system, which can pose problems of weight distribution and bulk.

In addition, the locking device comprises a locking rod which is moved by an electromagnet and can be subject to considerable radial forces due to the position of the locking device relative to the actuator.

SUMMARY OF THE INVENTION

An aim of the invention is to propose an alternative to the system of the prior art.

This aim is achieved in the present invention by using an actuating device for moving a movable cowl of a thrust reverser, comprising:

an actuator comprising a first element and a second element mounted movable in translation relative to the first element, one of the first element and the second element being a screw, and the other being a nut suitable for cooperating with the screw, so that a rotation of the first element relative to the second element causes a translation of the second element relative to the first element, a locking device comprising a locking part movable between a locked position in which the locking part prevents the rotation of the first element, and an unlocked position in which the locking part allows the rotation of the first element, and a lock inhibitor device comprising a housing and a ball movable between a stowed position in which the ball extends inside the housing and allows a motion of the locking part between the locked position and the unlocked position, and an inhibiting position in which the ball protrudes out of the housing to prevent the return of the locking part to the locked position.

The device can further have the following features:

the ball is movable in translation along a radial direction relative to the axis of rotation of the first element, the lock inhibitor device comprises a guide part movable between a first position in which the guide part leaves the ball free in the housing, and a second position in which the guide part urges the ball out of the housing toward the inhibiting position, the guide part comprises a recess in which the ball is received when the ball is in the stowed position, the guide part comprises a guide track suitable for guiding the ball toward the inhibiting position when the guide part is moved toward the second position, the guide part is movable in translation relative to the first element parallel to an axis of rotation of the first element, the device comprises a rod that is movable in translation relative to the first element and suitable for being urged by the second element to move the guide part toward the first position, the movable rod extends at least in part inside the first element, the device comprises a return member suitable for urging the guide part toward the second position, the locking part is movable in translation relative to the first element parallel to an axis of rotation of the first element, the locking device comprises an electromagnet which, when powered, urges the locking part toward the unlocked position, the locking device comprises a return member suitable for urging the locking part toward the locked position, the locking part comprises a recess arranged so that when the locking part is in the unlocked position, the ball engages with the recess to prevent the return of the locking part to the locked position, the device comprises a casing and a support mounted in a fixed manner relative to the casing, the housing being formed in the support, the support and the locking part each have grooves, the grooves of the support and the grooves of the locking part being able to cooperate with one another to guide the locking part in translation relative to the support.

PRESENTATION OF THE DRAWINGS

Other features and advantages will also become apparent from the following description, which is purely illustrative and non-limiting, and must be read with reference to the appended figures among which:

FIG. 1, consisting of the partial

DETAILED DESCRIPTION OF AN EMBODIMENT

Figure 1A:
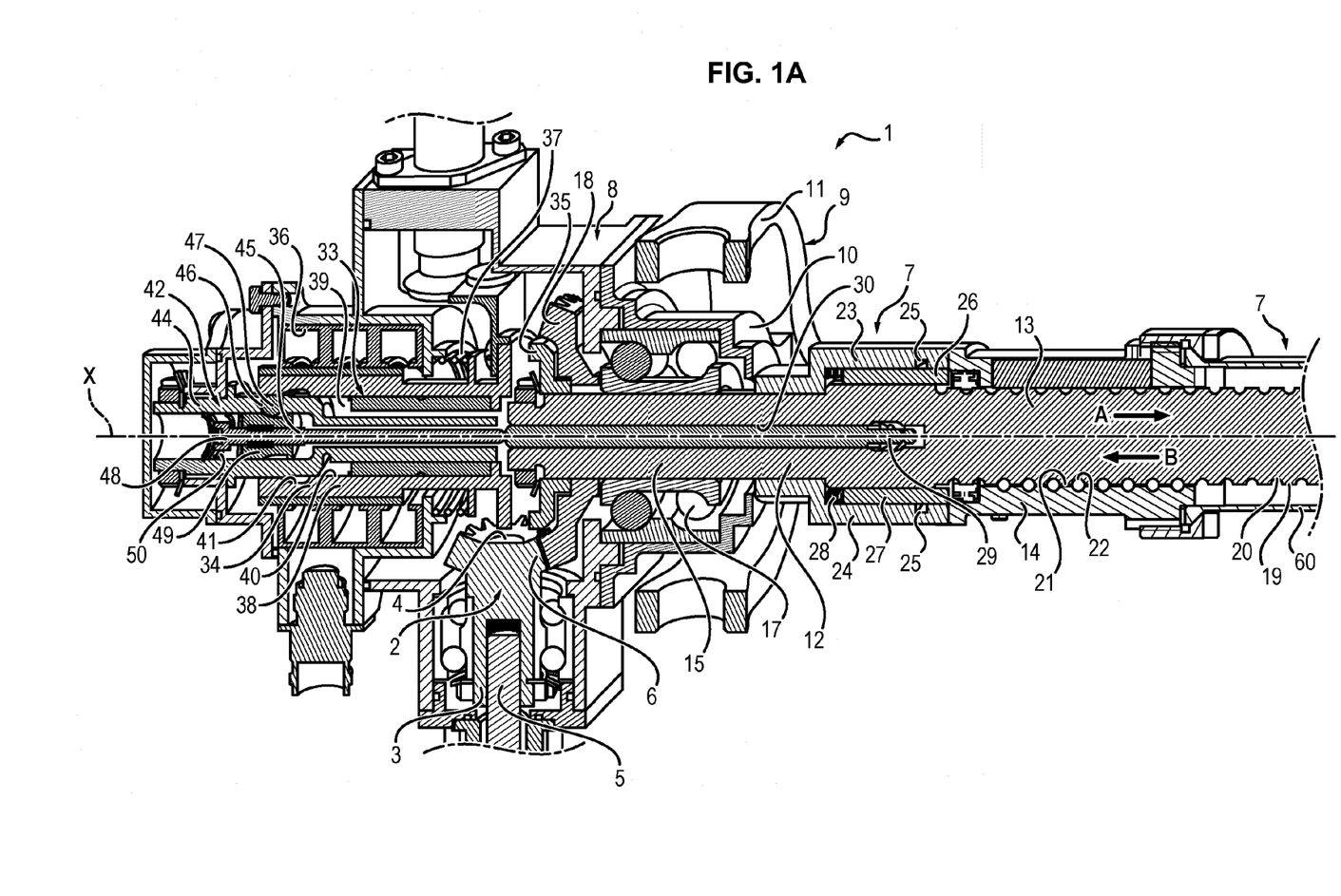
FIGS. 1A and 1B, is a schematic representation, in longitudinal section view, of an actuating device conforming to an embodiment of the invention.
Figure 1B:
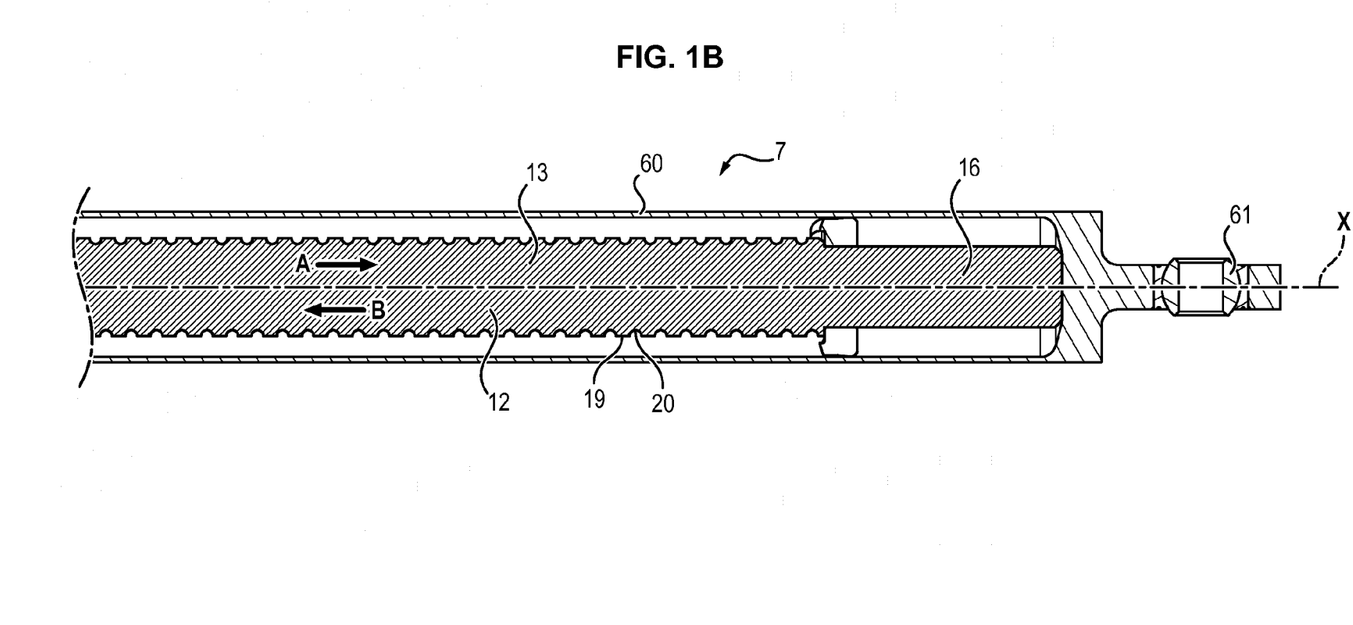

In FIG. 1, the actuating device 1 represented comprises a drive shaft 2 having a first end 3 and a second end 4. The first end 3 is shaped to be able to be attached to a motor shaft 5 or flexible shaft of a thrust reverser, the motor shaft 5 being linked to a drive motor of the actuating device 1. The second end 4 comprises a meshing portion 6.

The actuating device 1 also comprises an actuator 7, the motion of which is controlled by the drive shaft 2.

The actuating device 1 also comprises a casing 8 intended to be mounted on a nacelle of the airplane. For this purpose, the actuating device 1 comprises a gimbal assembly 9 comprising a first gimbal part 10 fastened to the casing 8 and a second gimbal part 11 rotatably mounted on the first gimbal part 10 about a first axis of rotation. The second gimbal part 11 is suitable for being rotatably mounted on the nacelle about a second axis of rotation perpendicular to the first axis of rotation. Such a gimbal assembly makes it possible to avoid the appearance of stresses that might be generated by a possible disalignment between the axis of deployment of the actuator and the direction of motion of the movable cowl.

The actuator 7 comprises a screw 12 having a body 13 of generally elongated cylindrical shape, and a nut 14 extending about the body 13 of the screw 12.

The screw 12 is rotatably mounted relative to the casing 8 about an axis of rotation X corresponding to the longitudinal axis of the screw 12 and also corresponding to the axis of deployment of the actuator 7. The screw 12 comprises a first end 15 (or receiving end) intended to receive a drive couple and a second end 16 (or free end). The screw 12 is rotatably mounted relative to the casing 8 by way of a ball bearing system 17 disposed between the screw 12 and the casing 8.

The actuator 7 moreover comprises an input bevel gear 18 mounted integral with the screw 12, at the first end 15 of the screw 12. The input bevel gear 18 meshes with the meshing portion 6 of the drive shaft 2, so as to transmit a rotational motion of the drive shaft 2 to the screw 12.

The nut 14 is intended to be linked to an actuator tube 60 having one end linked to a movable component of the thrust reverser (a movable cowl for example) by way of a ball joint connection.

The nut 14 is mounted movable in translation relative to the screw 12 along the longitudinal axis X of the screw 12 to move the actuator tube between two end positions corresponding to a retracted configuration and a deployed configuration of the actuator 7 respectively.

For this purpose, the body 13 of the screw 12 has a cylindrical outer surface 19 in which a helical groove 20 is formed. The nut 14 has a cylindrical inner surface 21 in which a helical groove 22 is formed. The screw 12 and the nut 14 cooperate with one another by way of the helical grooves 20 and 22 in which balls are housed so that a rotation of the screw 12 relative to the casing 8 causes to a translation of the nut 14 relative to the screw 12 along the direction X.

The actuator 7 also comprises an stop part 23 fixedly mounted to the screw 12. The stop part 23 comprises a cylindrical part 24 extending around the screw 12 and fastened to the screw 12 by fastening pins 25.

The actuator 7 further comprises a pusher 26 mounted movable in translation relative to the screw 12. The pusher 26 extends between the end stop 23 and the screw 12. The pusher 26 comprises a cylindrical ring 27 extending around the screw 12. The cylindrical ring 27 is positioned in such a way as to be pushed by the nut 14 when the nut 14 approaches the extreme position corresponding to a retracted configuration of the actuator 7. This has the effect of moving the pusher 26 relative to the screw 12 toward the first end 15 of the screw 12 (direction represented by the arrow B).

The actuator 7 comprises a return member 28, such as a compression spring for example, arranged between the stop part 23 and the pusher 26. The return member 28 is suitable for urging the pusher 26 in the opposite direction (i.e. toward the second end 16 of the screw 12), which has the effect of moving the pusher 26 toward the second end 16 of the screw 12 when the nut 14 moves away from the end retracted position (direction represented by the arrow A.)

The actuator 7 further comprises an unblocking rod 29. The unblocking rod 29 extends inside a longitudinal bore 30 of the screw 12. The unblocking rod 29 is able to slide relative to the screw 12 in the longitudinal bore along the axis X. The unblocking rod 29 is mounted integral with the pusher 26 via a pin 31 linking the unblocking rod 29 and the pusher 26, in a transverse direction relative to the axis X. The pin 31 is able to slide in a radial hole 32 formed in the body 13 of the screw 12.

The actuating device 1 also comprises a locking device 33 housed inside the casing 8.

The locking device 33 comprises a first locking part 34 mounted movable in translation relative to the casing 8 along the axis X (and therefore relative to the screw 12) and a second locking part 35 mounted so as to form a single part with the screw 12.

The locking device 33 also comprises a cylindrical guide part 55. The guide part 55 is fixedly mounted relative to the first locking part 34 and has longitudinal grooves extending parallel to the axis X.

The actuating device 1 also comprises a bush 43 fixedly mounted to the casing 8. The bush 43 also has longitudinal grooves extending parallel to the axis X. The guide part 55 and the bush 43 cooperate with one another by way of the grooves receiving balls so as to allow a translation of the first locking part 34 relative to the casing 8 along the axis X, and to prevent a rotation of the first locking part 34 about the axis X.

The first locking part 34 is movable in translation relative to the second locking part 35 between a locked position (illustrated in FIG. 5B) in which the first locking part 34 engages the second locking part 35, thus preventing rotation of the screw 12, and an unlocked position (illustrated in FIG. 4B) in which the first locking part 34 is disengaged from the second locking part 35, thus allowing rotation of the screw 12.

Figure 3:
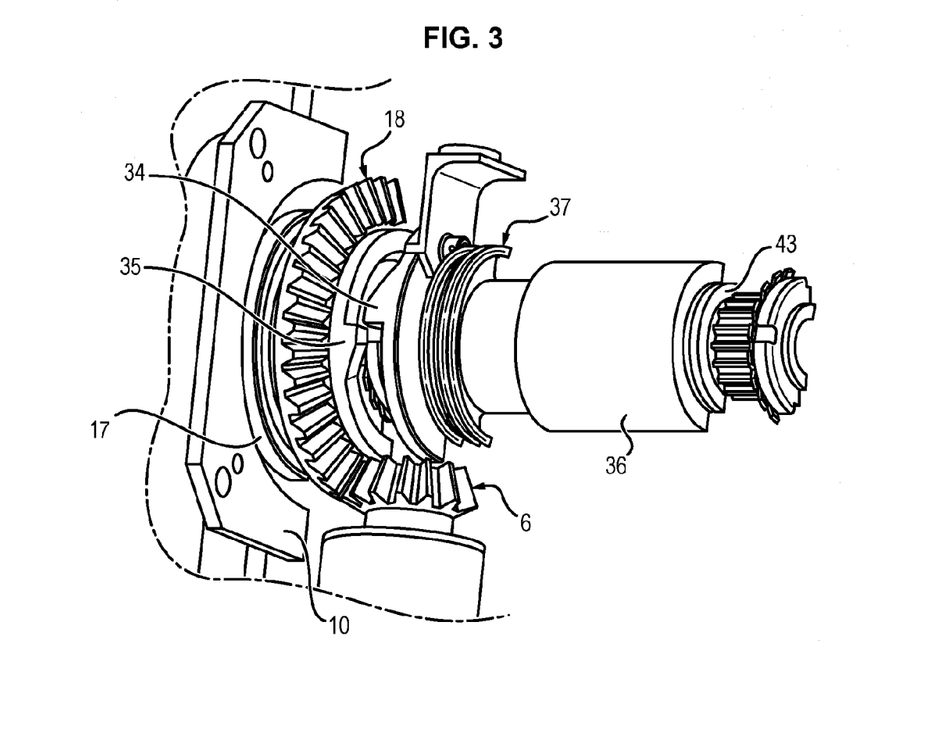
FIG. 3 is a detail view of the locking device, FIGS. 4A and 4B schematically represent the actuating device in the unlocked configuration, FIGS. 5A and 5B schematically represent the actuating device in the locked configuration.
Figure 7:
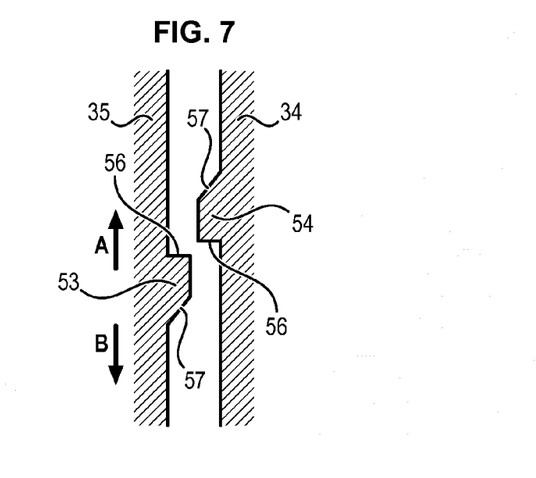

More precisely, as can be seen in FIGS. 3 and 7, the first locking part 34 and the second locking part 35 each comprise locking teeth 53, 54. The teeth 53 of the first locking part 34 and the teeth 54 of the second locking part 35 have an asymmetrical shape. Each tooth 53, 54 comprises a blocking face 56 extending according to a plane passing by the axis X, and a sliding face 57 extending in a plane inclined relative to the axis X. When the first locking part 34 is in the locked position, the teeth 53, 54 prevent the rotation of the screw 12 in a first direction (arrow A) corresponding to the direction of deployment of the actuator 7. Specifically, the blocking faces 56 of the teeth 53 of the first locking part 34 abut the blocking faces 56 of the teeth 54 of the second locking part 35. However in this position, the teeth 53, 54 allow the rotation of the screw 12 in a second direction (arrow B), opposite to the first direction (arrow A), corresponding to the direction of retraction of the actuator. Specifically, the sliding faces 57 of the teeth 54 of the second part 35 can slide over the sliding faces 57 of the teeth 53 of the first locking part 34. Thus, in the event of a failure of the locking device 33, it is possible to control a retraction of the actuator 7 despite the locked position of the first locking part 34.

The locking device 33 comprises an electromagnet 36 which, when electrically powered, urges the first locking part 34 toward the unlocked position.

The locking device 33 also comprises a return member 37 arranged to urge the first locking part 34 toward the locked position. The return member 37 is a helical compression spring extending between the casing 8 and the first locking part 34.

Figure 2:
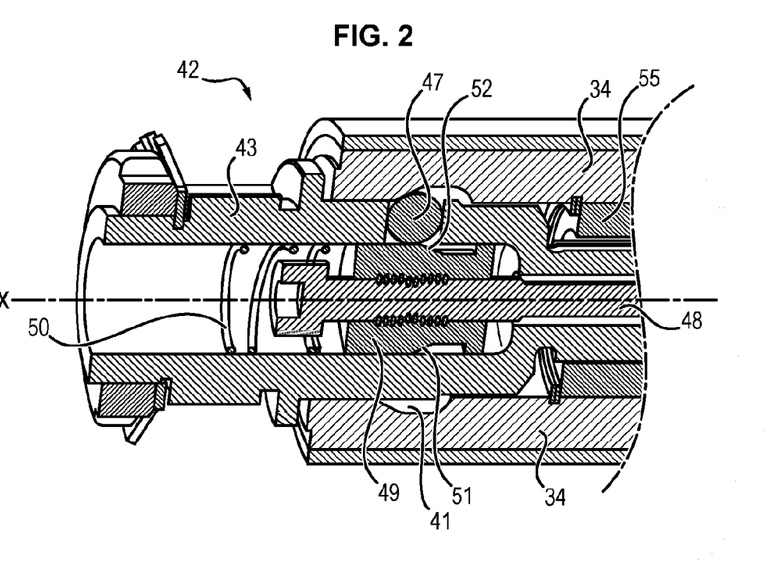
FIG. 2 is a detail view of the lock inhibitor device.

As is illustrated in FIG. 2, the first locking part 34 comprises a cylindrical wall 38 defining an inner cavity 39. The cylindrical wall 38 has an inner surface 40 in which an annular reinforcement 41 is formed.

Figure 6:
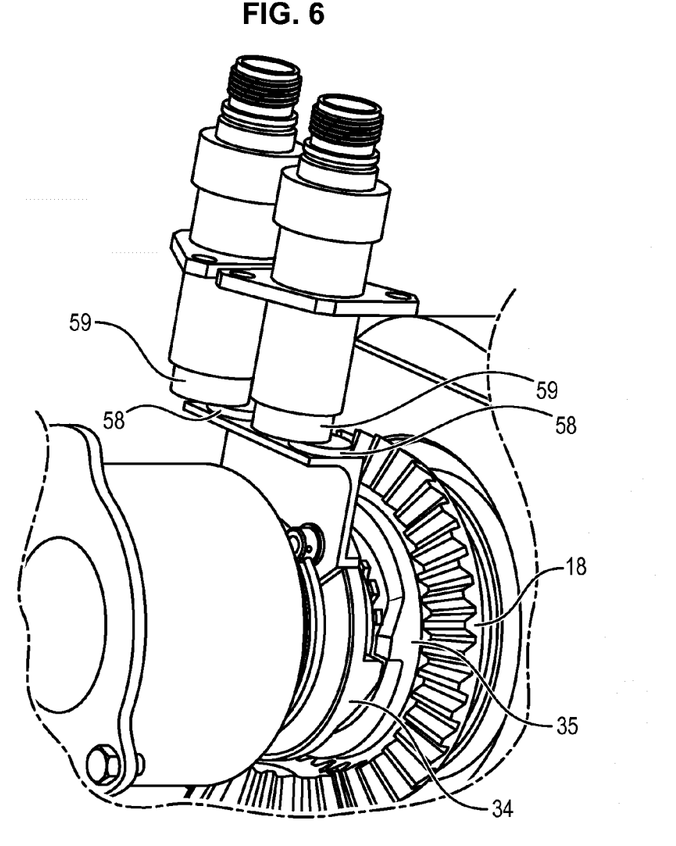
FIG. 6 is a detail view of a detecting device, FIG. 7 schematically represents the teeth of the locking part.

As illustrated in FIG. 6, the locking device 33 also comprises metal targets 58 fixedly mounted to the first locking part 34, and sensors 59 mounted on the casing 8, each sensor 59 being positioned facing an associated metal target 58. Each sensor 59 is capable of detecting a position of the metal target 58 located facing it relative to the sensor 59. The sensors 59 are capable of generating signals representing the locked or unlocked state of the locking device 33.

The actuating device 1 also comprises a lock inhibitor device 42 housed inside the casing 8.

The lock inhibitor device 42 comprises a bush 43, fixedly mounted to the casing 8. The bush 43 comprises a wall 44 having a generally cylindrical shape and defining an inner cavity 45. The bush 43 also comprises a lateral opening 46 through the wall 44 and extending along a radial direction relative to the axis X.

The lock inhibitor device 42 further comprises a ball 47 of generally spherical shape received freely in the opening 46. The opening 46 thus serves as a housing for the ball 47. The thickness of the wall 44 is less than the diameter of the ball 47, so that the ball 47 always extends partly inside the opening 46.

The lock inhibitor device 42 also comprises an actuating finger 48 and a piston 49 extending inside the bush 43 and controlled by the actuating finger 48. The actuating finger 48 and the piston 49 are slidably mounted in the bush 43. The piston 49 is fixedly mounted to the actuating finger 48. Thus, the actuating finger 48 and the piston 49 are mounted movable in translation relative to the bush 43 along the direction of the axis X between a release position (illustrated in FIGS. 5A and 5B) and a blocking position (illustrated in FIGS. 4A and 4B).

The actuating finger 48 extends along the axis X and is capable of being urged by the unblocking rod 29 in the second direction (arrow B) when the nut 14 approaches the retracted end position.

Moreover, the lock inhibitor device 42 comprises a return member 50 arranged to urge the piston 49 in the first direction (arrow A), opposite to the second direction. The return member 50 is a helical spring arranged between the casing 8 and the piston 49.

The piston 49 comprises a recess 51 for receiving the ball 47 extending around the circumference of the piston 49. When the ball 47 is in the stowed position (position illustrated in FIG. 5A), the recess 51 extends facing the opening 46 and is suitable for partly receiving the ball 47 protruding from the opening 46 into the inside of the bush 43. The recess 51 comprises an inclined surface 52 forming a guide track for the ball 47. The inclined surface 52 is arranged so that translation of the piston 49 along the axis X has the effect of pushing the ball 47 toward the outside of the bush 43 in a radial direction relative to the axis X. The piston 49 thus makes it possible to guide the ball 47 toward an inhibiting position (position illustrated in FIG. 5B), in which the ball 47 protrudes from the opening 46 out of the bush 43.

Figure 5A:
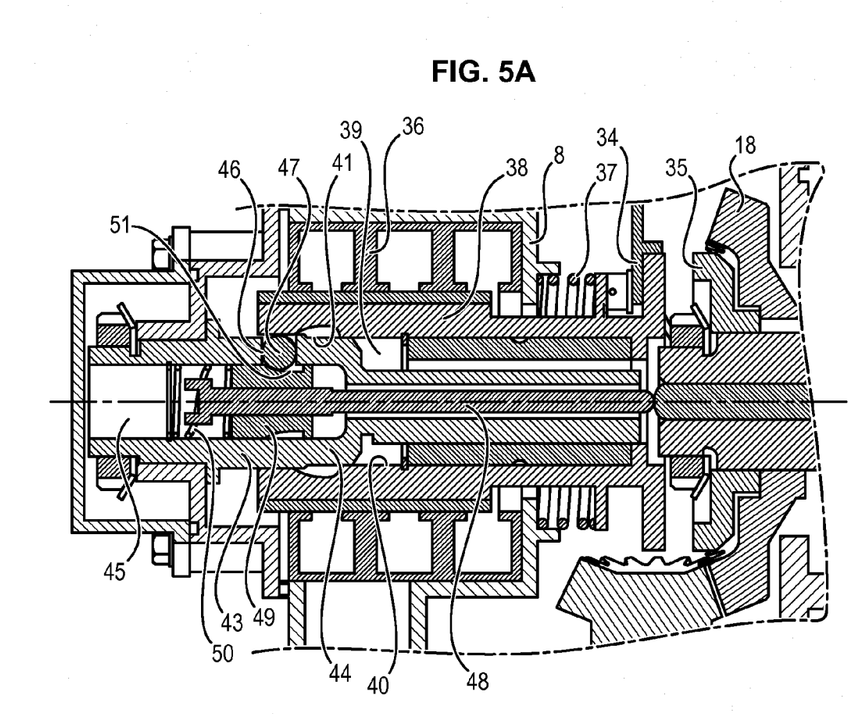
Figure 5B:
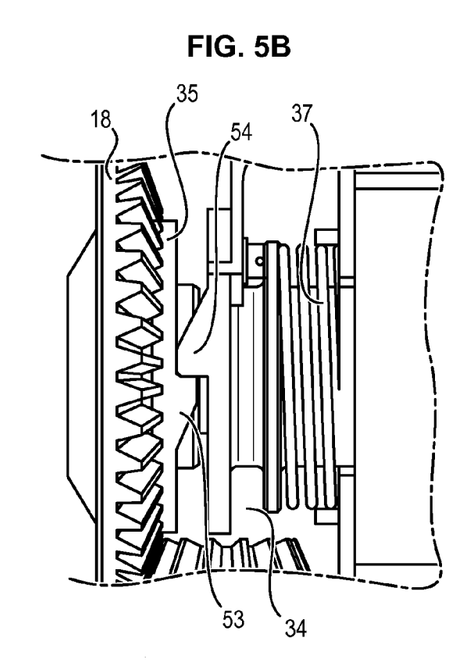

In operation, the actuator 7 is initially in the retracted configuration and the locking device 33 is locked (FIGS. 5A and 5B).

In this configuration, the nut 14 is abutting the stop part 23. In this end position, the nut 14 urges the pusher 26 toward the first end 15 of the screw 12 (arrow B), which has the effect of compressing the return member 28 and pushing the unblocking rod 29 toward the piston 49. The piston 49 is thus held in place by the rod 29 in the de-inhibited position (position illustrated in FIG. 5A).

In addition, the first locking part 34 is in the locked position (position illustrated in FIG. 5B). In this position, the first locking part 34 grips the second locking part 35. More precisely, the teeth 53 of the first locking part 34 are positioned facing the teeth 54 of the second locking part 35 while being interspaced with the teeth 54, which prevents any rotation of the screw 12.

Consequently, the locking device 33 prevents any motion of the actuator.

As the actuator 7 is locked, accidental deployment of the thrust reverser is not possible.

In addition, the ball 47 is in the stowed position in the opening 46 (position illustrated in 5A). The wall 38 of the first locking part 34 prevents any motion of the ball 47 out of its housing toward the inhibiting position. In this position, the ball 47 allows a motion of the first locking part 34 relative to the bush 43.

Figure 4A:
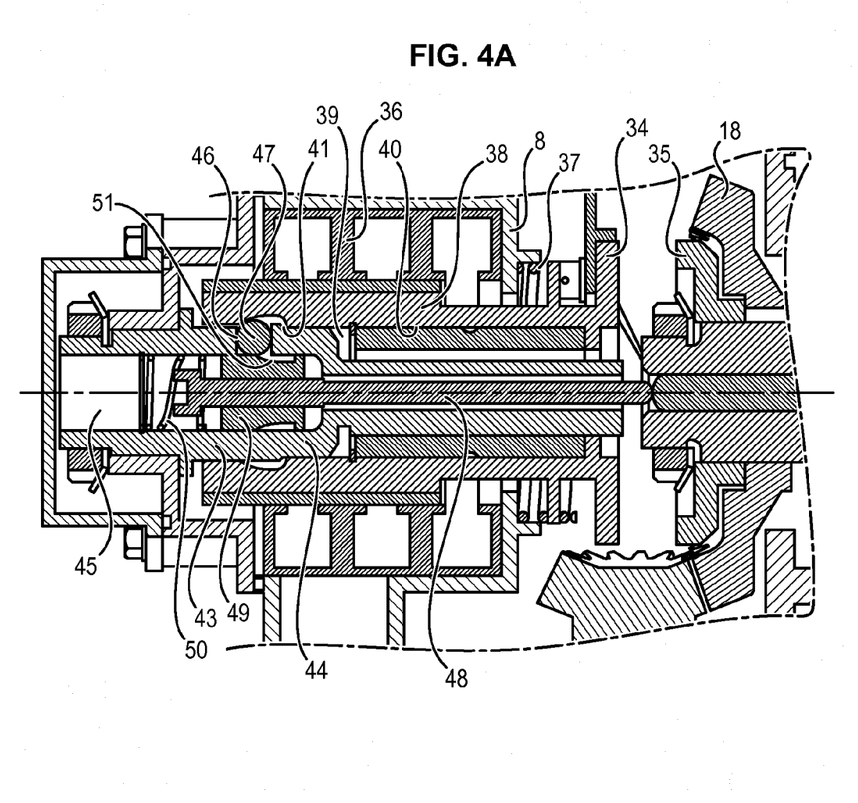
Figure 4B:
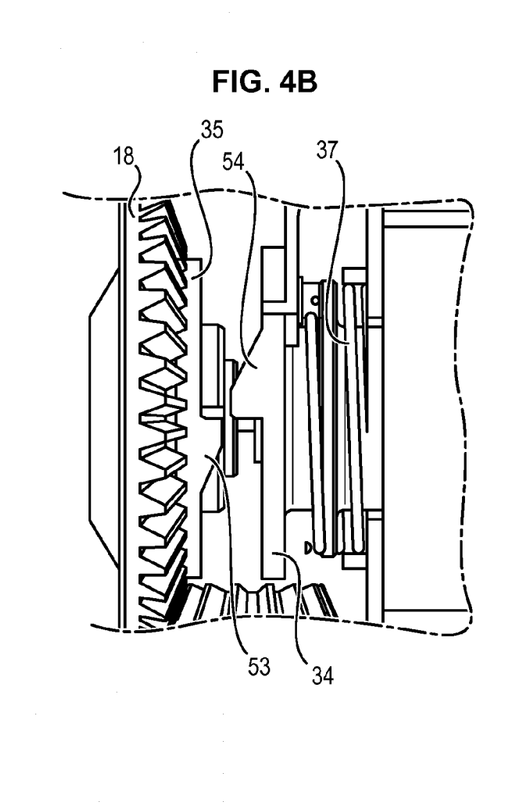

When the pilot controls the deployment of the thrust reverser, a control system triggers the power supply of the electromagnet 36, which has the effect of moving the first locking part 34 from the locked position (FIGS. 5A and 5B) to the unlocked position (FIGS. 4A and 4B.)

Once the first locking part 34 is in the unlocked position (position illustrated in FIGS. 4A and 4B), the first locking part 34 is disengaged from its engagement with the second locking part 35. More precisely, the teeth 53 of the first locking part 34 are no longer interspaced with the teeth 54 of the second locking part 35, which allows rotation of the screw 12.

In addition, when the first locking part 34 is in the unlocked position, the recess 41 of the first locking part 34 is positioned facing the opening 46 in which the ball 47 is received.

When the actuator is deployed, the drive shaft 2 is driven rotationally in a first direction by the drive motor of the actuating device via the motor shaft 5. The drive shaft 2 drives the screw 12 rotationally via the meshing portion 6 and the input bevel gear 18. The rotation of the screw 12 relative to the nut 14 drives to the translation of the nut 14 relative to the screw 12 along the axis X, in the direction of deployment of the actuator (arrow A.)

As the nut 14 is no longer abutting the stop part 23, the nut 14 releases the pusher 26. The return member 28 urges the pusher 26 toward the second end 16 of the screw 12, which has the effect of moving the unblocking rod 29 away from the piston 49.

As the piston 49 is no longer urged by the rod 29, the return member 50 brings the piston 49 back to the blocked position. The piston 49 is translated relative to the bush 43 parallel to the axis X, so that the piston 49 pushes the ball 47 inside the opening 46 toward the outside of the bush 43. When the piston 49 is in the blocked position, the ball 47 protrudes out of the opening 46 and engages with the recess 41 of the first locking part 34, which has the effect of prohibiting translation of the first locking part 34 relative to the bush 43. In this position (inhibiting position), the ball 47 prevents the return of the first locking part 34 to the locked position.

Thus, the lock inhibitor device 42 prevents the locking of the actuator 7 while the thrust reverser is not completely retracted.

When the pilot controls the retraction of the thrust reverser, the drive shaft 2 is driven rotationally in a second direction, opposite to the first direction, by the drive motor of the actuator device via the motor shaft 5. The drive shaft 2 drives the screw 12 rotationally via the meshing portion 6 and the input bevel gear 18. The rotation of the screw 12 relative to the nut 14 drives to the translation of the nut 14 relative to the screw 12 along the axis X, in the direction of retraction of the actuator (arrow B.)

When the actuator 7 is almost completely retracted, the nut 14 urges the pusher 26 to the first end 15 of the screw 12, which has the effect of compressing the return member 28 and pushing the unblocking rod 29 toward the piston 49.

The unblocking rod 29 then urges the piston 49 toward the release position.

The piston 49 is translated relative to the bush 43 parallel to the axis X, so that the recess 51 of the piston 49 takes up a position facing the opening 46. In this position, the piston 49 no longer holds the ball 47 in the inhibiting position. The ball 47 is then free to return to the stowed position.

Under the action of the return member 37, the first locking part 34 urges the ball 47 radially toward the inside of the bush 43, which causes a motion of the ball 47 inside the opening 46 toward the stowed position. The ball 47 releases the passage from the first locking part 34 and allows the return of the first locking part 34 to the locked position.

The return member 37 causes the automatic motion of the first locking part 34 into the locked position. The locking of the actuator 7 is thus performed without requiring an electrical power supply.

Once the nut 14 is abutting the stop part 23, the actuator 7 is fully retracted.

Once the actuator 7 is locked by the locking device 33, the deployment of the actuator 7 is no longer possible without having previously controlled the unlocking of the locking device 33.

The actuating device 1 that has just been described has the advantage of being able to be easily incorporated into the head of a preexisting actuator, since the locking device can interface with a standard drive shaft 2.

REFERENCE NUMBERS

1 Actuating device
2 Drive shaft
3 First end of the drive shaft
4 Second end of the drive shaft
5 Motor shaft of the thrust reverser
6 Meshing portion of the drive shaft
7 Actuator
8 Casing
9 Gimbal assembly
10 First gimbal part
11 Second gimbal part
12 Screw of the actuator
13 Body of the screw
14 Nut of the actuator
15 First end of the screw (receiving end)
16 Second end of the screw (free end)
17 Ball bearing system
18 Input bevel gear
19 Cylindrical outer surface
20 Helical groove
21 Cylindrical inner surface
22 Helical groove
23 Stop part
24 Cylindrical part
25 Fastening pins
26 Pusher
27 Cylindrical ring
28 Return member connected to the pusher
29 Unblocking rod
30 Longitudinal bore of the screw
31 Pin
32 Radial hole
33 Locking device
34 First locking part
35 Second locking part
36 Electromagnet
37 Return member connected to the first locking part
38 Cylindrical wall of the first locking part
39 Inner cavity of the first locking part
40 Inner surface of the cylindrical wall
41 Annular recess 42 Lock inhibitor device
43 Bush
44 Wall of the bush
45 Inner cavity of the bush
46 Lateral opening
47 Ball
48 Actuating finger
49 Piston
50 Return member connected to the piston
51 Recess of the piston
52 Inclined surface of the recess
53 Teeth of the first locking part
54 Teeth of the second locking part
55 Guide part
56 Blocking face of a tooth
57 Sliding face of a tooth
58 Metal targets
59 Sensors
60 Actuating tube
61 Ball joint connection

The invention claimed is:

1. An actuating device for moving a movable cowl of a thrust reverser, comprising:
    a casing,
    an actuator comprising a first element and a second element mounted movable in translation relative to the first element, one of the first element and the second element being a screw, and the other being a nut suitable for cooperating with the screw, so that a rotation of the first element relative to the second element causes a translation of the second element relative to the first element,
    a locking device comprising a locking part movable between a locked position in which the locking part prevents rotation of the first element, and an unlocked position in which the locking part allows rotation of the first element, and
    a lock inhibitor device comprising a support fixedly mounted relative to the casing, a housing formed in the support and a ball movable in the housing between a stowed position in which the ball allows a motion of the locking part between the locked position and the unlocked position, and an inhibiting position in which the ball protrudes out of the housing to prevent the return of the locking part to the locked position.

2. The device according to claim 1, wherein the ball is movable in translation along a radial direction relative to an axis of rotation of the first element.

3. The device according to claim 2, comprising a return member suitable for urging the guide part toward the second position.

4. The device according to claim 1, wherein the lock inhibitor device comprises a guide part movable between a first position in which the guide part leaves the ball free in the housing, and a second position in which the guide part urges the ball out of the housing toward the inhibiting position.

5. The device according to claim 4, wherein the guide part comprises a recess in which the ball is received when the ball is in the stowed position.

6. The device according to claim 4, wherein the guide part comprises a guide track suitable for guiding the ball toward the inhibiting position when the guide part is moved toward the second position.

7. The device according to claim 4, wherein the guide part is movable in translation relative to the first element parallel to an axis of rotation of the first element.

8. The device according to claim 4, comprising a rod that is movable in translation relative to the first element and suitable for being urged by the second element to move the guide part toward the first position.

9. The device according to claim 8, wherein the movable rod extends at least in part inside the first element.

10. The device according to claim 1, wherein the locking part is movable in translation relative to the first element parallel to an axis of rotation of the first element.

11. The device according to claim 1, wherein the locking device comprises an electromagnet which, when powered, urges the locking part toward the unlocked position.

12. The device according to claim 1, wherein the locking device comprises a return member suitable for urging the locking part toward the locked position.

13. The device according to claim 1, wherein the locking part comprises a recess arranged so that when the locking part is in the unlocked position, the ball engages with the recess to prevent the return of the locking part to the locked position.

14. The device according to claim 1, wherein the support and the locking part each have grooves, the grooves of the support and the grooves of the locking part being able to cooperate with one another to guide the locking part in translation relative to the support.

* * * * *